Oct. 22, 1957  R. M. WINNAN  2,810,460
STORM SASH FRAME STRUCTURE
Filed May 13, 1955  2 Sheets-Sheet 1
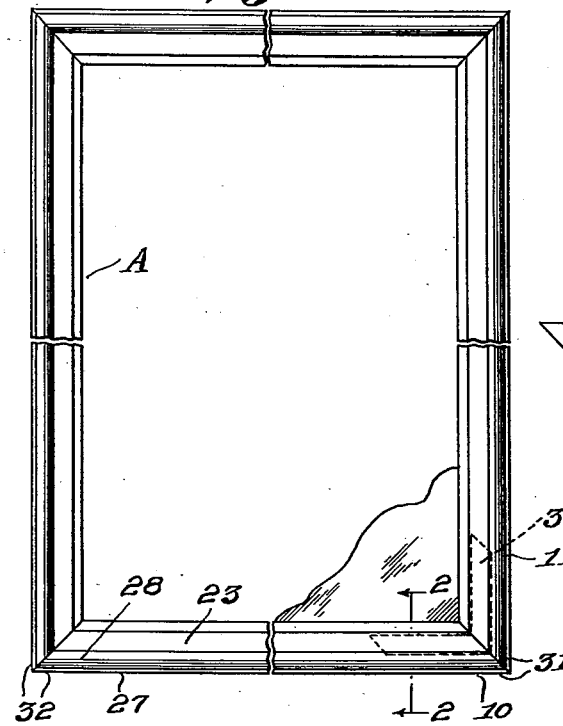
Fig. 1.
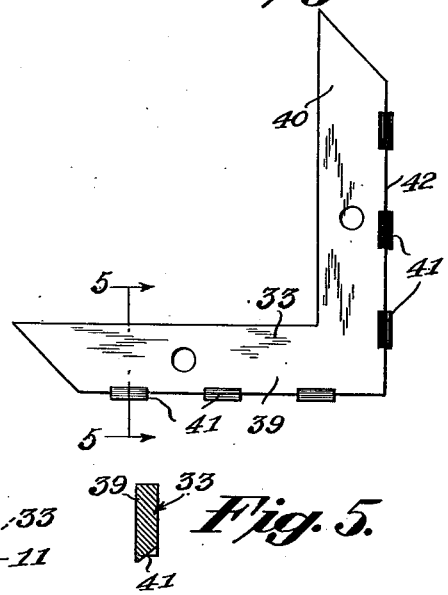
Fig. 4.
Fig. 5.
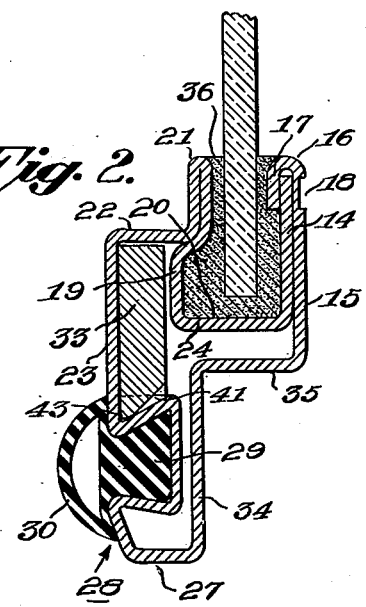
Fig. 2.
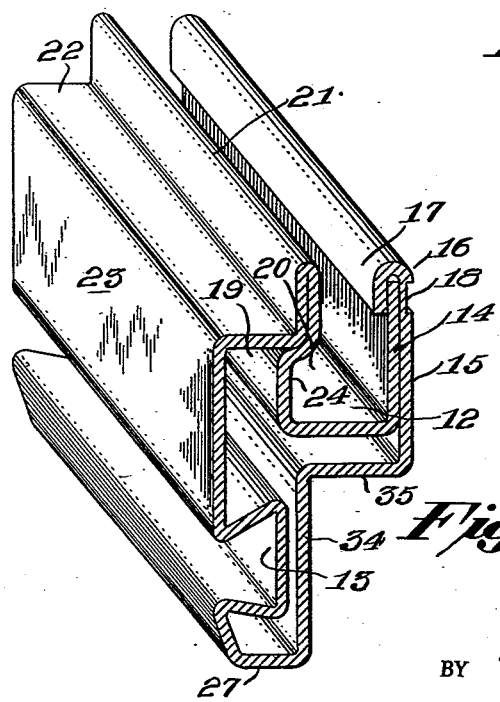
Fig. 3.
INVENTOR
Russell M. Winnan
BY 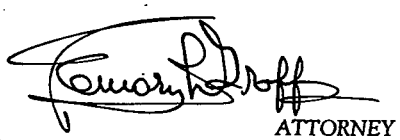
ATTORNEY Oct. 22, 1957 R. M. WINNAN 2,810,460
STORM SASH FRAME STRUCTURE
Filed May 13, 1955 2 Sheets-Sheet 2
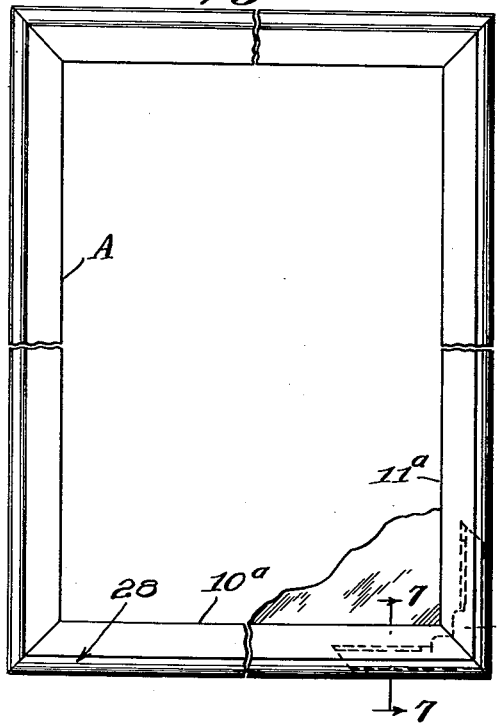
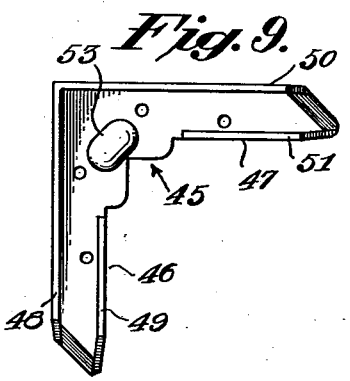
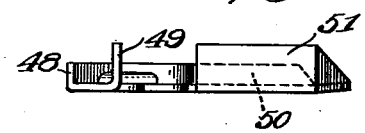
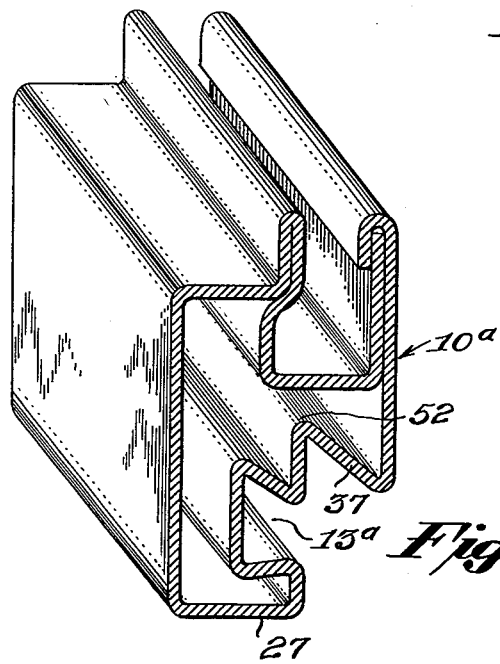
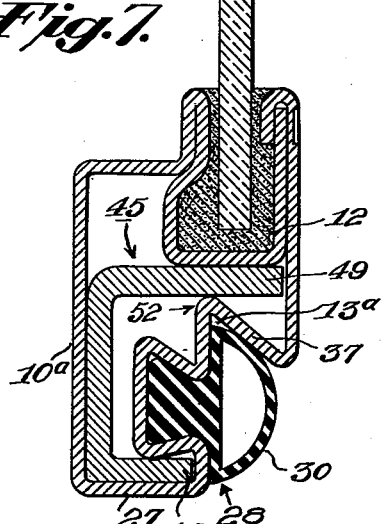
INVENTOR
Russell M. Winnan
BY
ATTORNEY

2,810,460
Patented Oct. 22, 1957

United States Patent Office

2,810,460

STORM SASH FRAME STRUCTURE

Russell M. Winnan, Miami, Fla., assignor to American Screen Products Company, Miami, Fla., a corporation of Florida Application May 13, 1955, Serial No. 508,163

2 Claims. (Cl. 189—76)

The present invention relates generally to a rolled metal frame structure and more particularly to a metal frame made of sections for holding window glass and molded plastic weatherstrip of storm sash formations.

An object of this invention is to provide in one rolling operation a frame section with a novel glass channel adapted to increase the holding strength of the glazing compound therein with the peripheral edge of the glass window.

Another object is to provide in one rolling operation a novel frame section with a combined window glass channel and a dove-tail weatherstrip channel for slidably receiving molded plastic weatherstrip.

A further object is to provide a novel hollow window frame from rolled aluminum strip or the like, whereby the sections of the frame are formed with a novel glass channel and a novel weatherstrip channel, said sections each having their transverse end edges mitered for connection by corner brackets co-actively and frictionally engaged with adjacent inner portions of the rolled channel of the frame sections.

With these and other objects in view the invention consists in the features of construction, combination and arrangement of parts as will be hereinafter more fully described in detail, illustrated in the accompanying drawings and which disclose several forms of the invention.

In the drawings:

Fig. 1 shows a completely assembled storm window in front elevation.

Fig. 2 is a cross section view taken on section line 2—2 of Fig. 1.

Fig. 3 is a partial cross section view on an enlarged scale of a perspective view of the frame section without the assembled parts.

Fig. 4 is a front elevational view of one form of corner bracket used to connect the frame members together.

Fig. 5 is a cross section view taken on section line 5—5 of Fig. 4.

Fig. 6 is a completely assembled view illustrating another form of the invention.

Fig. 7 is a cross section view taken on section line 7—7 of Fig. 6.

Fig. 8 is a cross section view taken on a section line through a partial perspective of the second form of frame.

Fig. 9 is a rear elevation view of a second form of corner brace as illustrated in Figs. 6 and 7.

Fig. 10 is an end elevational view of the corner brace of Fig. 9.

Referring to the drawings in detail and first with particular reference to Fig. 1, there is illustrated an assembled window structure A with a corner of a rolled metal window sash formed of hollow frame sections 10 and 11. These sections, as can be observed from the several Figs. 1 through 6 relating to the first form, are rolled from metal strips and formed with a glass holding channel 12 and a weatherstrip channel 13. The glass holding channel 12 is shown in detail in the enlarged partial perspective cross sectional view in Fig. 3, and the outer side wall of the channel is comprised of two plies or layers of a material 14 and 15 pressed and secured together by a seam 16 of three plies or layers including the upper turned edge 17 of layer 15. This seam is securely locked by notches or serrations 18, for example, six or more serrations per inch. Opposite to the serrated side wall is a side wall 19, which is a continuation of layer 14 and bottom surface 20 of the channel. This wall 19 is doubled over to form a two ply section 21, which continues until it is offset and separated to form a flange 22 of the side wall 23 of the frame section and to form an inside offset glazing compound chamber 24 having its side wall, that is, wall 19 substantially parallel to the side wall 23.

The side wall 23 is formed into the dove-tail weatherstrip channel 13 adjacent the bottom edge 27 of the frame section. As shown in Figs. 2 and 3, a molded weatherstrip 28 comprising an extruded synthetic plastic formation having a solid dovetail base 29 and an enlarged hollow tubular head 30 is slidably mounted in the dovetail channel 13. As shown in Fig. 1, the ends 31 of each weatherstrip are mitered so as to complete a rectangular framing of weatherstripping around the respective side walls 23 of each frame section. These frame sections are also each formed with mitered ends 32 and joined together at each corner by corner brace means 33.

From the bottom edge 27 each of the respective frame sections extend continuously to provide the opposite side wall 34, which wall extends to offset surface 35 below the glass holding channel bottom and continues into the layer or ply section 15.

It is to be noted that the material of the sheet strip forming the frame sections is maintained spaced apart throughout so as to form a hollow structure, except for the seam portions of the channel 12 as hereinbefore described. This hollow structure permits the arms of the respective corner brace means 33 to frictionally fit into each hollow mitered end of each of the adjacent frame sections for assembly, see Figs. 1 and 2. Before complete assembly the groove or channel 12 is filled with glazing compound 36, which flows into the offset chamber 24 of the same to increase the holding strength of the compound and the frame sections are loaded with the weatherstrip 28 by sliding the same into the respective dove-tail channels 13 and then the frame sections are corner braced together at all four corners.

The resulting frame structure is very strong and durable even though it is made of very narrow stock in comparison with prior storm sash frames. The narrowness of the frame permits much more vision and more light than possible with prior wider frames of wood, for example.

In Figs. 2 and 4 the cooperative action of the corner brace 33 and the interior bore shapes of the hollow frame sections are illustrated. For example, the arms 39 and 40 of the brace 33 are at substantially right angles to each other and the exterior edge of each of the arms is formed with angular serrations 41 formed with cutback edges 42. These serrations 41 fit into the crevice or groove 43 formed on the interior side of the dovetail channel wall, while the respective opposite edges of the brace arms 39 and 40 are flat and frictionally engage with the interior side of flange 22. Thus the interior portions of the rolled channel and sides coact with the corner brace 33 to secure the frame sections 10 and 11 together in final assembled formation.

A modification of the weatherstrip channel 13ª is illustrated in Figs. 6 through 10. For example, the inner side wall of each frame section 10ª and 11ª is formed with an angled flange 37 extending above the dove-tailed channel 13ª and laterally overlapping part of the channel. Part of the hollow tubular head 30 of the weatherstrip 28 also slides under this flange so that the outer longitudinal edge of the strip only is exposed for weather sealing purposes.

Another form of corner brace 45 is illustrated in Figs. 9 and 10 for use with the frame sections 10ᵃ and 11ᵃ illustrated in Figs. 6, 7 and 8. In this form of the brace the arms 46 and 47 are each formed with right angled flanges 48 and 49 and 50 and 51 along each longitudinal edge. These arms and flanges slide into the hollow mitered ends of the frame sections 10ᵃ and 11ᵃ in a tight frictional fit with the interior channel formations therein.

For example, the bottom wall of channel 12 and the edge 52 formed from the angle flange 37 frictionally grip the brace flange 49, while the interior of the bottom edge wall 27 and the bottom protruding edge of the weatherstrip channel frictionally grip the opposite flange 48. This gripping action is obviously duplicated on the brace arm 47 and its respective flanges 50 and 51.

Further in reference to Fig. 9 illustrating the corner brace, there is formed adjacent the apex of the arms an elongated blister or rounded projection 53. This blister 53 engages with the inner sides of the mitered ends of frame members 10ᵃ and 11ᵃ and serves to engage and bridge the respective surfaces of the mitered frame edges and more securely hold the members together.

Without further description it is believed that the foregoing description is sufficiently complete, and clear to enable any persons skilled in the art to practice the invention. However, it is to be expressly understood that although only several forms of the invention are described and illustrated in detail, that parts, arrangements and combinations of parts, which may now occur to others are likewise intended to be within the scope hereof. To determine the scope of this invention reference should be had to the appended claims.

I claim:

1. A storm sash frame comprising a plurality of sections each having opposite mitered ends, each section comprising a single strip of sheet metal rolled to provide a hollow section having a glass edge receiving channel and a weather strip receiving channel, the said sheet metal strip in its rolled position including an end portion forming one side wall of said glass edge receiving channel, a second portion normal to said first portion forming the bottom wall of said glass edge receiving channel, a third portion parallel to said first portion forming the lower part of the opposite side wall of said glass edge receiving channel, a fourth portion outwardly of said third portion comprising a fold in said strip and providing the upper part of said opposite side wall of said glass edge receiving channel, a fifth portion extending inwardly normal to said fourth portion, a sixth portion extending from said fifth portion normal thereto and in a direction opposite to said fourth portion, said sixth portion adjacent its lower edge being bent to provide said weatherstrip receiving channel, a seventh portion adjacent said weatherstrip receiving channel parallel with said fifth portion, an eighth portion parallel with said sixth portion and in spaced relation to the bottom wall of said weatherstrip receiving channel, a ninth portion parallel with and in spaced parallel relation with the bottom wall of said glass edge receiving channel, and a tenth portion parallel with and in engagement with the outer face of said first portion and having its edge turned inwardly over the edge of said first portion, said third, fifth and sixth portions in cooperation with a wall of said weatherstrip receiving channel providing a space for receiving an arm of an angular brace member in the connection of adjacent mitered ends of each pair of sections.

2. The structure according to claim 1, wherein said wall of said weather strip receiving channel is inclined toward said fifth portion, and a brace member for connecting adjacent mitered ends of each pair of sections, said brace member comprising a pair of right-angularly disposed arms having bevelled ends, and the outer edges of said arms being provided with longitudinally spaced serrations for cooperation with said inclined walls.

References Cited in the file of this patent

UNITED STATES PATENTS

| | | |
|---|---|---|
| 1,092,931 | McClellan | Apr. 14, 1914 |
| 2,093,727 | Julien | Sept. 21, 1937 |
| 2,122,666 | Verhagen | July 5, 1938 |
| 2,576,348 | Kinghorn | Nov. 27, 1951 |
| 2,703,159 | Van Fleet | Mar. 1, 1955 |